United States Patent [19]

Hibino et al.

[11] Patent Number: 4,723,215

[45] Date of Patent: Feb. 2, 1988

[54] METHOD FOR INDICATING A VEHICLE OPERATION IN A FUEL ECONOMY RANGE FOR A VEHICLE WITH A MANUAL TRANSMISSION

[75] Inventors: Yoshitaka Hibino, Utsunomiya; Hiroshi Kogure, Tokorozawa, both of Japan

[73] Assignee: Honda Giken Kogyo Kabushiki Kaisha, Tokyo, Japan

[21] Appl. No.: 777,387

[22] Filed: Sep. 18, 1985

[30] Foreign Application Priority Data

Sep. 28, 1984 [JP] Japan .................. 59-203278

[51] Int. Cl.⁴ ............... B60K 41/18; G09B 19/16; G07C 5/08
[52] U.S. Cl. ............... 364/442; 340/52 D; 364/424.1
[58] Field of Search ............... 364/424.1, 442; 434/71; 74/866; 340/52 D

[56] References Cited

U.S. PATENT DOCUMENTS

| | | | |
|---|---|---|---|
| 4,411,174 | 10/1983 | Yokoi et al. ..................... | 74/866 |
| 4,439,158 | 3/1984 | Weber ............................. | 434/71 |
| 4,463,427 | 7/1984 | Bonnetain et al. .............. | 364/424.1 |
| 4,492,112 | 1/1985 | Igarashi et al. ................ | 364/424.1 X |
| 4,495,457 | 1/1985 | Stahl .............................. | 364/424.1 |
| 4,622,637 | 11/1985 | Tomita et al. .................. | 364/424.1 |

FOREIGN PATENT DOCUMENTS 2084524 4/1982 United Kingdom ............ 364/424.1

Primary Examiner—Felix D. Gruber
Attorney, Agent, or Firm—Pollock, VandeSande & Priddy

[57] ABSTRACT

A method for indicating a vehicle operation in a fuel economy range, for a vehicle with a manual transmission, indicates that the vehicle is operating in a fuel economy range when both of an up-shifting condition and a down-shifting condition are not satisfied. The method further detects a non-regular state of the vehicle operation and stops the indication of the vehicle operation under the fuel economy range when the non-regular state of the vehicle operation is detected even though both of the up-shifting and down-shifting conditions are not satisfied.

4 Claims, 3 Drawing Figures

METHOD FOR INDICATING A VEHICLE OPERATION IN A FUEL ECONOMY RANGE FOR A VEHICLE WITH A MANUAL TRANSMISSION

BACKGROUND OF THE INVENTION

1. Field of the Invention

The present invention relates to a method for a vehicle having an engine and a manual transmission, for indicating that the vehicle, including its engine, is operating in a fuel economy range.

2. Description of Background Information

For vehicles having a manual transmission, various techniques for indicating an appropriate gear position have been proposed so as to promote fuel savings. For instance, Japanese patent application laid open No. 55-31669 discloses a technique in which the fuel economy range of the vehicle operation is derived as a state where both an up-shifting operation and a down-shifting operation are not required. When such a state is detected, an indication device such as an indication lamp is driven to show that the vehicle is operating in a fuel economy range.

However, in the case of this type of conventional technique, there has been a problem that the indication of the fuel economy range may sometimes become inappropriate. More specifically, the vehicle operation may become inappropriate, for example, due to a deterioration of the driveability even though it is indicated that the vehicle is operating in the fuel economy range. This is because the fuel economy range is simply derived as a state where both the up-shifting operation and the down-shifting operation are not required. Consequently, it is very likely that a driver may keep on driving the vehicle in a manner according to the indication of the fuel economy range in the indication device even though such manner of driving is not appropriate.

OBJECT AND SUMMARY OF THE INVENTION

An object of the present invention is therefore to provide a method for indicating a vehicle operation in a fuel economy range, in which inappropriate generation of an indication of a fuel economy running state, i.e. the indication that the vehicle is operating in the fuel economy range, is stopped so that the driver does not continue the inappropriate driving state.

According to the present invention, a method for indicating a vehicle operation in a fuel economy range is characterized in that the generation of the indication of the vehicle operation in a fuel economy range is stopped if predetermined non-regular running conditions are satisfied even under a state where the up-shift and down-shift conditions are not satisfied.

DETAILED DESCRIPTION OF PREFERRED EMBODIMENTS

Figure 1:
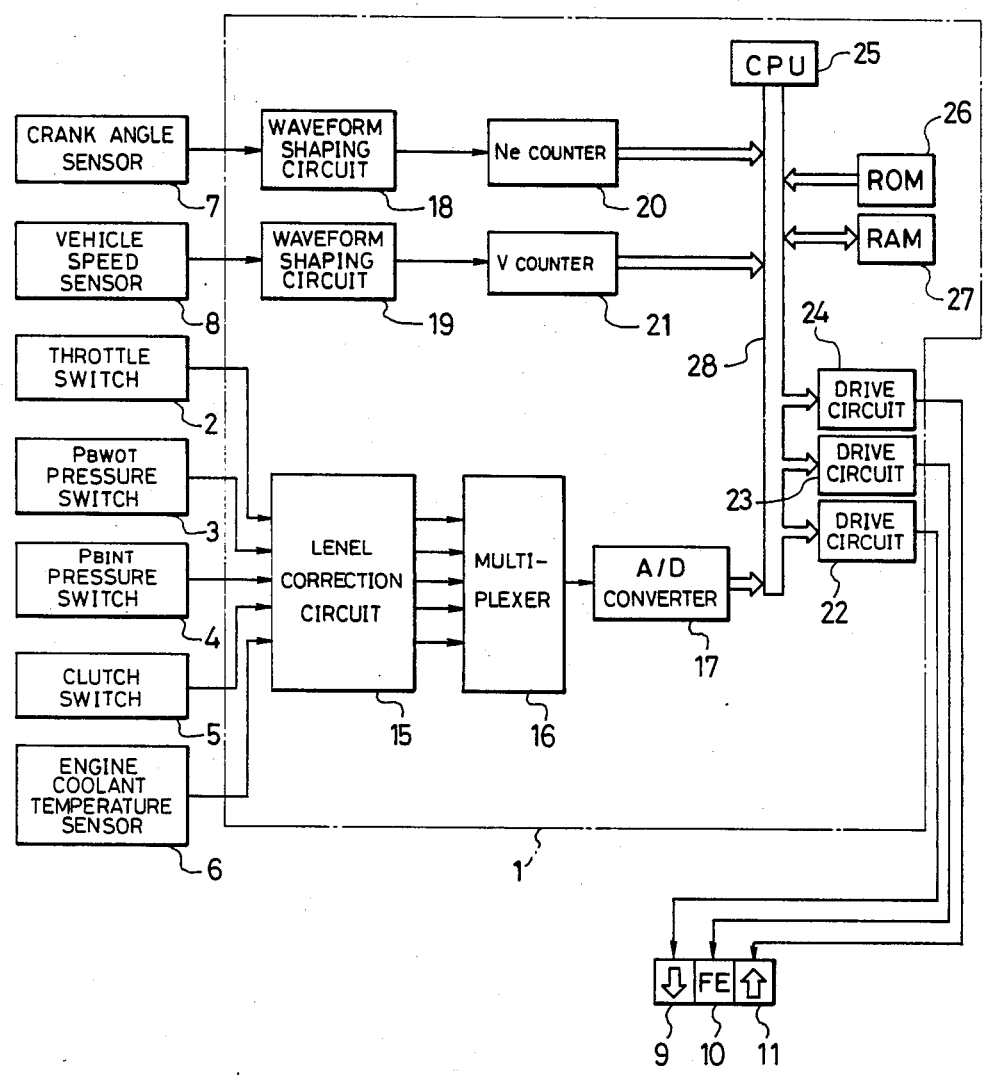
FIG. 1 is a block diagram of a system for indicating running conditions of the vehicle, in which the method for indicating the vehicle operation in a fuel economy range according to the present invention is suitably applied.

Reference is first made to FIG. 1, showing a device for indicating running states of the vehicle in which the method for indicating a vehicle operation in a fuel economy range according to the present invention is applied. This running states indication device includes a control circuit 1 which comprises a microcomputer. The control circuit 1 receives various sensor output signals, from a throttle switch 2, pressure switches 3 and 4, a clutch switch 5, an engine coolant temperature sensor 6, a crank angle sensor 7, and a vehicle speed sensor 8. Lamps 9 through 11 are also connected to the control circuit 1. The throttle switch 2 is adapted to turn on when a throttle valve of an internal combustion engine is closed. The pressure switch 3 turns on when a pressure $P_B$ in an intake manifold downstream of the throttle valve is equal to or greater than a predetermined level $P_{BWOT}$ ($-85$ mmHg for example), and the pressure switch 4 turns on when the pressure $P_B$ in the intake manifold downstream of the throttle valve is equal to or greater than another predetermined level $P_{BINT}$ ($-370$ mmHg for example) which is smaller than $P_{BWOT}$. The clutch switch 5 turns on when a clutch is disengaged to interrupt the transmission of engine power. These switches 2 through 5 produce a predetermined voltage when activated. The engine coolant temperature sensor 6 produces an output signal whose level varies with the temperature of the engine coolant. The crank angle sensor 7 generates an angular position signal whose period is inversely proportional to the rotational speed of the engine crankshaft. Similarly, the vehicle speed sensor 8 produces an angular position signal whose period is inversely proportional to the rotational speed of an output shaft of the manual transmission. The lamp 9 is provided to indicate that the vehicle is running under a state in which a down-shift of the manual transmission is required. On the other hand, the lamp 10 indicates that the vehicle is running under the fuel saving condition. In addition, the lamp 11 indicates that the vehicle is running under a state in which an up-shift of the manual transmission is required.

The control circuit 1 includes a level correction circuit 15 for correcting levels of signals from the throttle switch 2, the pressure switches 3 and 4, the clutch switch 5, and the engine coolant temperature sensor 6. Output signals of the level correction circuit 15 are then supplied to a multiplexer 16 which selectively transmits one of output signals of the switches 2 through 5 and the sensor 6 supplied through the level correction circuit 15. An analog output signal of the multiplexer 16 is in turn supplied to an A/D (analog to digital) converter 17 for converting the analog signal from the mutiplexer 16 to a digital signal. The control circuit 1 further includes waveform shaping circuits 18 and 19 respectively for shaping the waveform of the angular position signals from the crank angle sensor 7 and the vehicle speed sensor 8 to square wave pulse signals. An output pulse signal of the waveform shaping circuit 18 is in turn supplied to an $N_e$ counter 20 where the intervals of pulses of the output signal of the waveform shaping circuit 18 are measured by counting the number of predetermined clock pulses for each interval and producing a digital signal indicative of a value inversely proportional to the rotational speed of the engine. On the other hand, an output signal of the waveform shaping circuit 19 is supplied to a V counter 21 which measures intervals of output pulses of the waveform shaping circuit 19 by counting the number of predetermined clock pulses and producing a digital signal indicative of a value inversely proportional to the vehicle speed. The control circuit 1 further includes drive circuits 22 through 24 for driving the lamps 9 through 11, and a CPU (central processing unit) 25 and a ROM 26 for storing various programs and data, and a RAM 27. The A/D converter 17, the counters 20, 21, the drive circuits 22 through 24, the CPU 25, the ROM 26, and the RAM 27 are mutually connected via an I/O (input/output) bus 28.

In the thus constructed device, information as to the opening and closing of the throttle valve, the pressure $P_B$ in the intake manifold, the engagement or disengagement of the clutch, and the temperature of the engine coolant is selectively supplied to the CPU 25 through the I/O bus 28. Also, information of the engine speed $N_e$ and the vehicle speed V from the $N_e$ counter and the V counter 21 is supplied to the CPU 25 via the I/O bus 28.

The CPU 25 reads in the above mentioned various information according to a program stored in the ROM 26 and determines whether the up-shift is necessary, or whether the down-shift is necessary, and whether the vehicle is running under the condition of fuel economy, on the basis of this information. When the necessity of up-shift is determined by the CPU 25, a lamp drive command signal is supplied to the drive circuit 24. On the other hand, when the down-shift is determined to be necessary, a lamp drive command signal is supplied to the drive circuit 22. In addition, when the operation of the vehicle is determined to be under the fuel economy range, the lamp drive command signal is supplied to the drive circuit 23.

Figure 2:
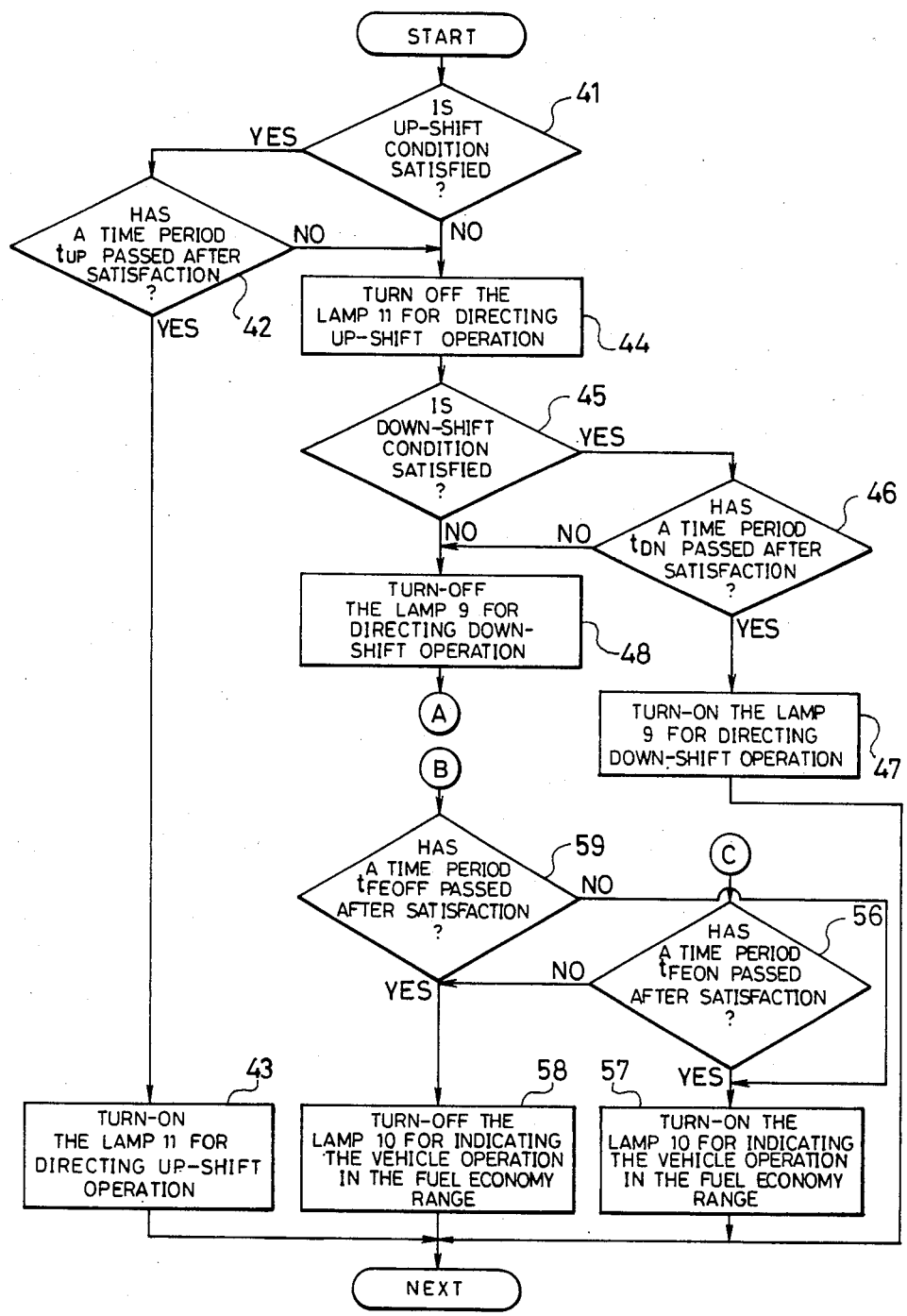
FIGS. 2 and 3, when combined, are a flow chart showing steps of an embodiment of the method for indicating the vehicle operation in the fuel economy range according to the present invention.
Figure 3:
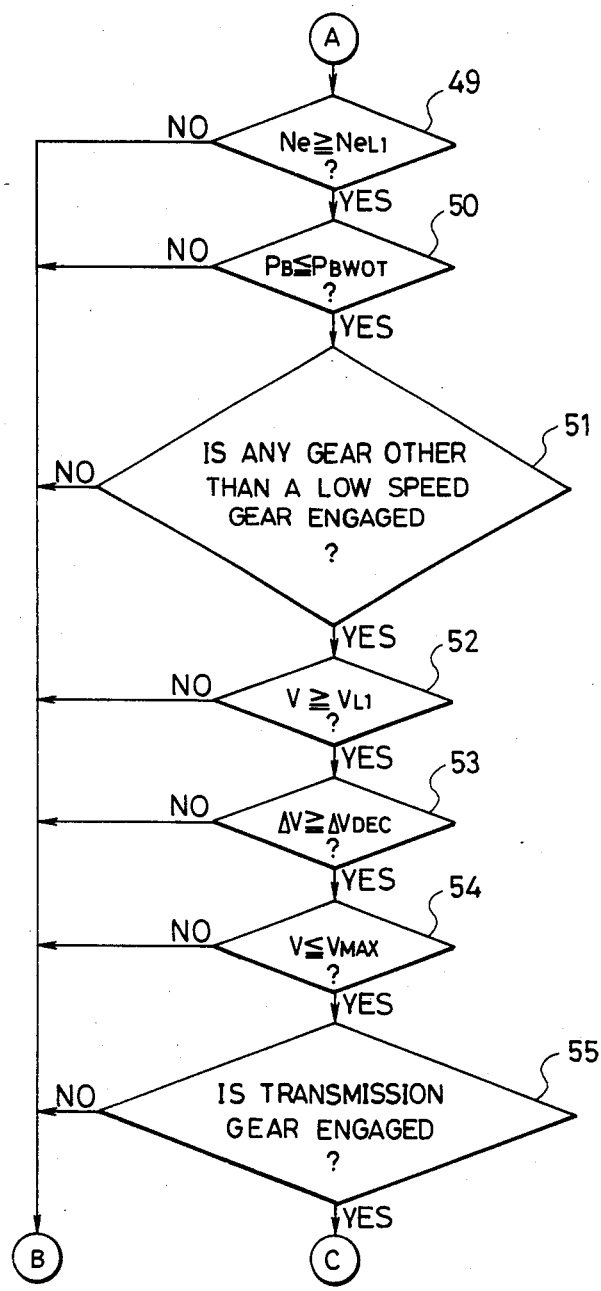

Referring now to the flow chart of FIG. 2, the operational sequence of the indication of the vehicle operation under a fuel economy range according to the present invention will be explained hereinafter.

In this sequence of operations, whether or not the vehicle is operating under a condition allowing the up-shift operation is determined at a step 41 first. If the vehicle is operating under a condition permitting the up-shift operation, whether or not a predetermined time period $t_{UP}$ has passed after the satisfaction of that condition is detected at a step 42. When the predetermined time period has passed, the lamp drive command signal is supplied to the drive circuit 24 so that the lamp 11 for indicating the timing of the up-shift operation turns on, at a step 43. When the predetermined time period $t_{UP}$ has not yet passed after the satisfaction of that condition, a lamp drive stop command signal is supplied to the drive circuit 24 so as to prevent an instantaneous light up of the lamp 11, by turning off the lamp 11 at a step 44. When the up-shift condition is not satisfied at the step 41, the program also goes to the step 44 so that the lamp 11 is turned off. Next, whether or not the vehicle operation is satisfying the down-shift condition is detected at a step 45. If the down-shift condition is satisfied, whether or not a predetermined time period $t_{DN}$ has passed after the satisfaction of the down-shift condition is detected at a step 46. If the predetermined time period $t_{DN}$ has already passed, a lamp drive command signal is supplied to the drive circuit 22 to turn on the lamp 9 for directing the down-shift operation at a step 47. If the predetermined time period $t_{DN}$ has not passed, a lamp drive stop command signal is supplied to the drive circuit 22 to stop the lighting of the lamp 9 at a step 48. The operation of the step 48 is also performed to stop the lighting of the lamp 9 if it is detected that the down-shift condition is not satisfied at the step 45.

The detection of the vehicle operation under a non-regular driving state, i.e. an inappropriate driving state even though it is in a "fuel economy range" of the usual sense, takes place in the following sequence. Whether or not the engine rotational speed $N_e$ is equal to or above a predetermined rotational speed $N_{eL1}$ (900 r.p.m. for example) is detected at a step 49. The predetermined rotational speed $N_{eL1}$ is set at a value slightly higher than an idling speed of the engine. If $N_e \geq N_{eL1}$, whether or not the pressure $P_B$ in the intake manifold is equal to or smaller than a predetermined pressure $P_{BWOT}$ (on the vacuum side) is detected at a step 50. IF $P_B \leq P_{BWOT}$, i.e. if the pressure switch 3 is in the off position, it is regarded that the vehicle operation is not in a state of rapid acceleration in which the throttle valve is fully opened, and whether or not the gear position is other than the low speed gear is detected at a step 51. The detection of gear position is performed using a ratio between the rotational speed of the engine $N_e$ and the vehicle speed V. If the detected gear position is other than the low speed gear, whether or not the vehicle speed V is equal to or above a predetermined speed $V_{L1}$ (15 Km/h for example) is detected at a step 52. If $V \geq V_{L1}$, it is regarded that the driving state of the vehicle is not the so-called "crawling state" and that a low fuel consumption is enabled. Then, whether or not the deceleration of the vehicle $\Delta V$ is equal to or more rapid than a predetermined deceleration level ($-10$ Km/h/sec$^2$ for example) is detected at a step 53. If $\Delta V \geq \Delta V_{DEC}$, it is regarded that the degree of deceleration is small and whether or not the vehicle speed V is equal to or lower than a predetermined speed $V_{MAX}$ (103 Km/h) such as a speed near the legal speed limit is detected at a step 54. If $V \leq V_{MAX}$, whether or not the gear is engaged is detected at a step 55. The engagement of the gear is determined using the output signal of the clutch switch 5, and if the clutch switch 5 is in the on position, it is determined that the gear is not engaged. If it is detected that the gear is engaged, it is regarded that the driving state of the vehicle is satisfying the condition of the vehicle operation under the fuel economy range. Then, whether or not a predetermined time period $t_{FEON}$ has passed after the satisfaction of the condition is detected at a step 56. This operation is provided so as to give a hysteresis characteristic to the operations of the turning on and turning off of the lamp 10. In this way, an instantaneous lighting of the lamp 10 is prevented. Thus, when the predetermined time period $t_{FEON}$ has passed after the satisfaction of the condition of the fuel economy, a lamp drive command signal is supplied to the drive circuit 23 to turn on the lamp 10 for indicating that the vehicle is operating in the fuel ecomony range at a step 57. If the predetermined time period $t_{FEON}$ has not passed, the lighting of the lamp 10 is stopped by a lamp drive stop command signal supplied to the drive circuit 23 at a step 58.

On the other hand, if $Ne < N_{eL1}$ at the step 49, $PB > P_{BWOT}$ at the step 50, an engagement of the low speed gear is detected at the step 51, $V < V_{L1}$ at the step 52, $\Delta V < \Delta V_{DEC}$ at the step 53, $V > V_{MAX}$ at the step 54 or it is detected that the gear is not engaged at the step 55, it is regarded that the driving state of the vehicle is satisfying the condition of the inappropriate driving state which is out of the driving state in a fuel economy range.

Specifically, if $N_e < N_{eL1}$, the discharging of the battery becomes greater than the charging of the battery due to a power down of an alternator or an AGC (ac generator), and moreover, the driveability of the engine becomes worse. Similarly, if $P_B > P_{BWOT}$, it means that vehicle is operating under a high load condition, for example when the throttle valve is fully opened for a rapid acceleration. Therefore, under these conditions, the driving state of the vehicle is not determined to be in the fuel economy range. This also applies to the conditions explained as follows. When the transmission gear is positioned in the low speed gear, the braking force with the fully closed throttle valve (engine brake) is excessively high, and driving of the vehicle at a low speed (especially at a "crawling" speed) raises the fuel consumption. When $V > V_{L1}$, the fuel consumption is high due to the slow speed. Also an amplitude of the waveform of an output signal of the vehicle speed sensor 8 becomes small and malfunctions tend to occur. When $\Delta V < \Delta V_{DEC}$, it means that the vehicle is decelerating rapidly, to waste kinetic energy. Further, it is likely that the brake is applied because the distance to a vehicle ahead of the vehicle becomes too short. Therefore, this driving state is regarded to be inappropriate. If $V > V_{MAX}$, it means the vehicle speed is higher than a legally permitted limit speed, and this state is regarded to be inappropriate. In addition, if it is detected that the gear is not engaged, it means that the braking action of the engine cannot be expected because the transmission of engine power is interrupted. Therefore, this state is regarded to be inappropriate since the "vapor lock" phenomenon may occur due to an excessive use of the foot brake during running on a long downward slope. Further, if an engine stall occurs under this kind of condition, braking force of the foot brake may be weakened by the stop of the operation of a power brake assist system using the pressure in the intake manifold. If the engine is provided with a fuel-cut function during deceleration, the fuel consumption becomes lower when the transmission gear is engaged. Thus, the driving state of the vehicle is determined to be inappropriate under various conditions stated above even though the vehicle is operating within the fuel economy range in the conventional sense: that is, neither an up-shifting nor a down-shifting operation is required.

When these conditions of inappropriate driving state are satisfied, whether or not a predetermined time period $t_{FEOFF}$ has passed after the satisfaction of the conditions is detected at a step 59. This step is provided for giving a hysteresis characteristic to the turning-off of the lamp 10 from a lighted state so as to prevent an instantaneous turning off of the lamp 10. When the predetermined time period $t_{FEOFF}$ has passed after the satisfaction of the conditions of inappropriate driving state, the operation of the step 58 is performed to stop the lighting of the lamp 10. On the other hand, if the predetermined time period $t_{FEOFF}$ has not passed after the satisfaction of the conditions of inappropriate driving state, the operation at the step 57 is performed to keep the lamp 10 on.

It will be appreciated from the foregoing, according to the method for indicating a vehicle operation in a fuel economy range according to the present invention, the indication that the vehicle is operating in the fuel economy range is stopped if a predetermined non-regular driving state is detected even though it is detected that both the up-shifting and down-shifting conditions are not satisfied. Therefore, the driver can recognize that the driving state of the vehicle is inappropriate. Thus, it becomes possible to prevent the vehicle from being continuously operated under an inappropriate state.

What is claimed is:

1. A method of indicating a vehicle as being inappropriately operated, the vehicle having an engine, a control circuit, a manual transmission for up-shift and down-shift operations, a plurality of input parameters being fed to the control circuit, the method comprising the steps of:
   (a) determining whether conditions for an up-shift operation are satisfied;
   (b) detecting whether conditions for a down-shift operation are satisfied if the conditions for the up-shift operation were found not to have been satisfied;
   (c) indicating the vehicle as operating in a fuel economy range when the conditions of both of the up-shift and down-shift operations are not satisfied;
   (d) determining an irregular vehicle operational state;
   (e) turning off and preventing any indication that the vehicle is operating in the fuel economy range when the irregular vehicle operational state is determined and when the conditions for both of the up-shift and down-shift operations are not satisfied.

2. The method as set forth in claim 1, wherein the determining an irregular vehicle operational state step comprises:
   recognizing the rotational speed of the engine as being lower than a predetermined reference speed which is slightly higher than an idling speed.

3. The method as set forth in claim 1, wherein the determining an irregular vehicle operational state step comprises:
   recognizing the speed of the vehicle as being lower than a predetermined reference speed.

4. The method as set forth in claim 1, wherein the determining an irregular vehicle operational state step comprises:
   recognizing the engagement of a low speed gear of the manual transmission.

* * * * *